(12) United States Patent
Robinson

(10) Patent No.: US 9,292,249 B2
(45) Date of Patent: Mar. 22, 2016

(54) SYSTEM WITH CONTENT DISPLAY MANAGEMENT

(71) Applicant: HEWLETT-PACKARD DEVELOPMENT COMPANY, LP, Fort Collins, CO (US)

(72) Inventor: Ian N Robinson, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 405 days.

(21) Appl. No.: 13/631,142

(22) Filed: Sep. 28, 2012

(65) Prior Publication Data

US 2014/0092121 A1   Apr. 3, 2014

(51) Int. Cl.
   *G09G 5/00* (2006.01)
   *G06F 3/14* (2006.01)
   *G09G 5/14* (2006.01)
   *G06F 9/44* (2006.01)

(52) U.S. Cl.
   CPC .............. *G06F 3/1454* (2013.01); *G09G 5/14* (2013.01); *G06F 9/4445* (2013.01); *G09G 2340/10* (2013.01); *G09G 2340/12* (2013.01)

(58) Field of Classification Search
   USPC ........................................... 345/634
   See application file for complete search history.

(56) References Cited

U.S. PATENT DOCUMENTS

| | | | | |
|---|---|---|---|---|
| 5,025,314 A | * | 6/1991 | Tang et al. | 348/14.08 |
| 5,283,560 A | * | 2/1994 | Bartlett | 715/729 |
| 5,428,724 A | * | 6/1995 | Silverbrook | 345/640 |
| 5,499,327 A | * | 3/1996 | Satoh | 345/634 |
| 5,590,265 A | | 12/1996 | Nakazawa | |
| 5,805,163 A | * | 9/1998 | Bagnas | 715/768 |
| 5,877,762 A | * | 3/1999 | Young | 715/803 |
| 6,369,830 B1 | * | 4/2002 | Brunner et al. | 345/629 |
| 7,068,266 B1 | * | 6/2006 | Ruelle | 345/418 |
| 7,168,048 B1 | * | 1/2007 | Goossen et al. | 715/797 |
| 7,747,965 B2 | | 6/2010 | Holecek et al. | |
| 8,120,623 B2 | * | 2/2012 | Lee et al. | 345/639 |
| 8,201,102 B2 | * | 6/2012 | Lee et al. | 715/806 |
| 8,698,873 B2 | * | 4/2014 | Barrus | 348/14.08 |
| 2004/0179017 A1 | * | 9/2004 | Martyn et al. | 345/536 |
| 2008/0082907 A1 | * | 4/2008 | Sorotokin et al. | 715/210 |
| 2008/0195969 A1 | * | 8/2008 | Brown et al. | 715/802 |
| 2009/0183080 A1 | * | 7/2009 | Thakkar et al. | 715/733 |
| 2009/0307762 A1 | * | 12/2009 | Cudd, Jr. | 726/5 |
| 2010/0188478 A1 | * | 7/2010 | Robinson et al. | 348/14.16 |
| 2012/0139918 A1 | * | 6/2012 | Michail et al. | 345/421 |
| 2012/0206471 A1 | * | 8/2012 | Sarnoff et al. | 345/581 |

FOREIGN PATENT DOCUMENTS

TW     200847002     12/2008

OTHER PUBLICATIONS

Ishak, E.W. et al.; "Interacting with Hidden Content Using Content-aware Free-space Transparency"; Oct. 24-27, 2004; http://www1.cs.columbia.edu/~ishak/publications/p189-ishak.pdf: pp. 189-192.

* cited by examiner

*Primary Examiner* — M Good Johnson
(74) *Attorney, Agent, or Firm* — HP Inc Legal Department

(57) ABSTRACT

A method performed by a processing system with content display management includes identifying a first added content in a set of added contents that overlap and forming a display image to include the first added content such that a first portion of the first added content is partially transparent with respect to remote content captured by a remote system and a second portion of the first added content is opaque with respect to at least a portion of second added content in the set of added contents.

20 Claims, 3 Drawing Sheets

SYSTEM WITH CONTENT DISPLAY MANAGEMENT

BACKGROUND

Remote collaboration and videoconferencing systems allow remotely located users to collaborate with one another. Users at one location can see and interact with users at other locations in real-time and without noticeable delay. Some of these systems may provide gaze and gesture awareness by placing a camera behind a see-through display. At times during interactive collaborations, the systems may display content on the screens of the local and/or remote users. As the amount of content increases on the screen, the content may begin to reduce the ability of the users to interact collaboratively. In particular, the content may reduce the gaze and gesture awareness of a user.

DETAILED DESCRIPTION

Figure 1:
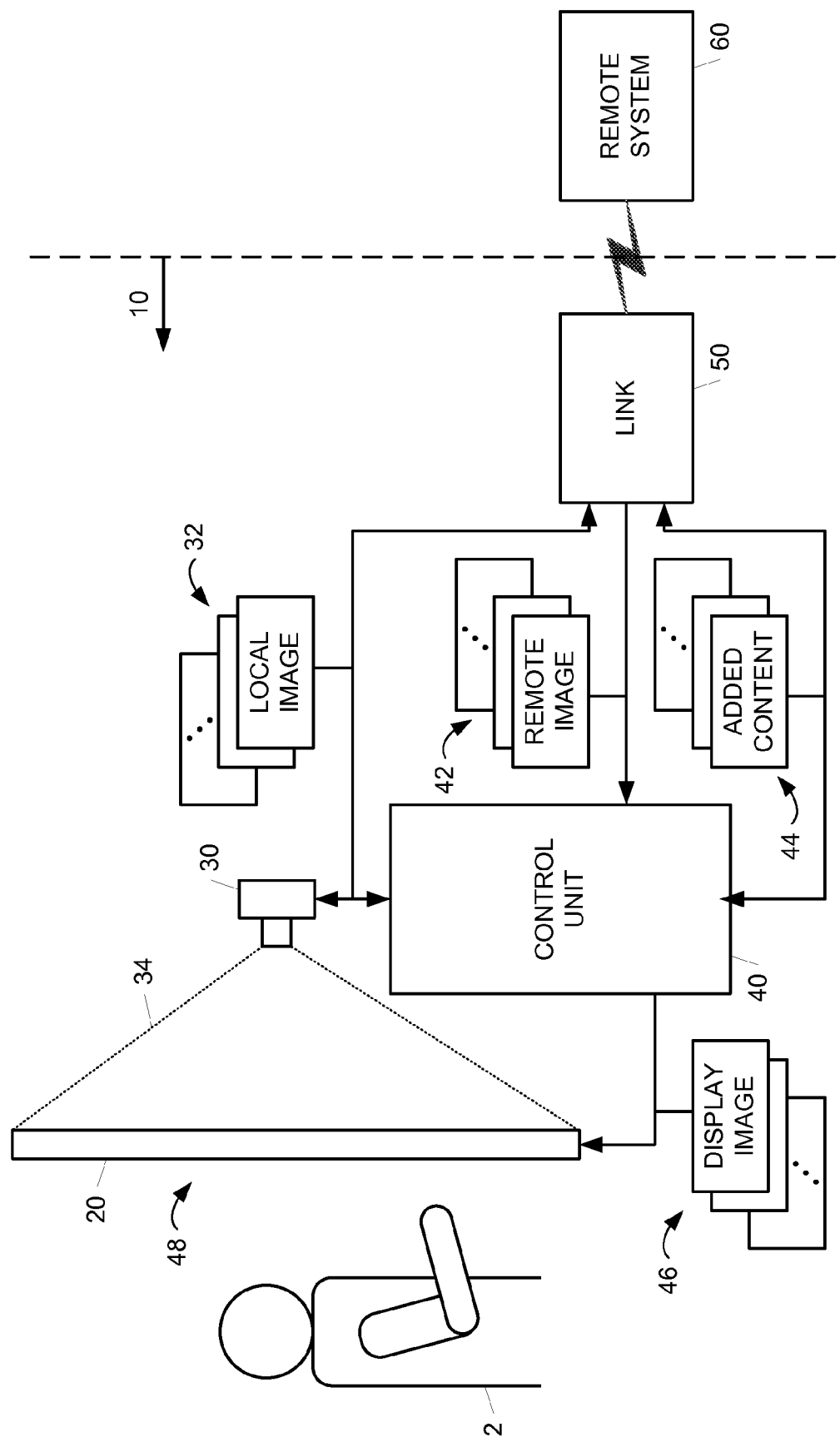
FIG. 1 is a schematic diagram illustrating an example of a display-camera system with content display management.

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term content refers to visual and/or audio information that is reproduced for a user using any suitable video and/or audio output devices for the display-camera systems described herein. The terms local and remote are descriptive terms that define a physical separation of between the described systems, persons, or objects and other systems, persons, or objects. The physical separation may be any suitable distance between locations such as a short distance within the same room or between adjacent rooms of a building or a long distance between different countries or between Earth and outer space.

The term local content refers to content that is captured or provided by a local system (e.g., a local display-camera system), and the term remote content refers to content that is captured or provided by a remote system (e.g., a remote display-camera system). The term local user refers to a person who views a local display-camera system, and the term remote user refers to a person who views a remote display-camera system. The term shared content refers to content that displayed on both a local display-camera system and a remote display-camera system such that the same content is viewable by both a local user or users and a remote user or remote users from different locations.

The terms overlaps and overlapping, when used with reference to first and second content, refers to at least portions of the first and the second content that are intended to be displayed on a common portion on a display.

The term occluding content refers to content that is at least partially overlaps with other content such that the other content is occluded (i.e., has a reduced visibility to a user) in the portion or portions of a display that displays the occluding content. The term occluded content refers to content that is occluded in the portion or portions of a display that displays occluding content.

The term partially transparent, when used with reference to occluding content, indicates that the occluded content is at least partially visible to a user through the occluding content in the portion or portions of a display that displays occluded content. The term opaque, when used with reference to occluding content, indicates that the occluded content is not visible to a user through the occluding content when displayed in the portion or portions of a display that displays occluded content.

As described herein, a display-camera system is configured to implement content display management to compose the display of multiple sources of added content on a display. The display-camera system receives remote content from a remote system (e.g., a remote display-camera system) that may include captured images of one or more remote users and displays the remote content to one or more local users using a display. The display-camera system also captures local content of the local users through the display using a camera and transmits the local content to the remote system. This communication between the display-camera system and the remote system allows local and remote users to interact collaboratively with natural interactions that include eye contact along with gaze and gesture awareness. The display-camera system may be used in remote collaboration or videoconferencing systems or in human-machine interactions (e.g., automatic teller machine (ATM)) transactions, for example.

The display-camera system also allows local and/or remote users to cause added content (e.g., content windows) to be displayed by the display-camera system and the remote system. The added content may be any suitable visual and/or audio information produced or displayed by an application or other suitable program, such as a virtual whiteboard that allows local and/or remote users to generate content visible to both the local and the remote users (e.g., using a touch screen) or a video stream.

To retain eye contact and gaze and gesture awareness, display-camera system may display added content with partial transparency to allow the gaze and gestures of remote users to be seen by the local users. The amount of transparency may depend on the type of the added content. For example, a virtual whiteboard may have a relatively high amount of transparency and a video stream of a shared video may have a relatively low amount of transparency.

If users display multiple added contents (e.g., multiple content windows), the various added contents may overlap on the display. If left unchanged, the combined transparencies in overlapping portions of the added contents may diminish the visibility of the remote users as seen by the local users. In addition, the gaze and gestures of remote users may become ambiguous when they refer to the overlapping portions. Further, overlapping content in the overlapping portions may make it difficult for users to see or understand the various separate contents (e.g., if letters from one window overlap with letters in another window such that they appear jumbled to the user). Although a user may adjust the added contents by moving them around on the display, this approach requires the user to manually interact with the system in order to manage the display of the content.

To manage multiple added contents automatically, the display-camera system determines a stacking order of added contents so that in any regions of a display where overlap occurs the system can determine which added content is top-most. The display-camera system uses only the top-most content in the stacking order and the remote content in each overlapping region to form a portion of the displayed image for that region. Added contents other than the top-most added content are not used to form the displayed image in overlapping regions. As a result, the display-camera system causes the top-most content in each overlapping region to be partially transparent with respect to an overlapping portion of the remote content from the remote system. The display-camera system also causes the top-most content in each overlapping region to be opaque with respect to any other added content. With this approach to display content management, the visibility of the remote users to the local users is diminished only by the transparency of a single added content even in regions where multiple added contents overlap.

FIG. 1 is a schematic diagram illustrating an example of a display-camera system 10 with content display management. Display-camera system 10 receives remote content (shown as remote images 42) from a remote system 60 using a link 50 where the remote content may include captured images of one or more remote users (not shown). Display-camera system 10 forms display content (shown as display images 46) from the remote content and added content 44, if any, from the local and/or remote users and provides the display content to a display 20. Added content 44 may be any suitable visual and/or audio information produced or displayed by an application or other suitable program, such as a virtual whiteboard that allows local and/or remote users to generate content visible to both the local and the remote users or a video stream. Added content 44 may take the form of content windows that are displayed in conjunction with the remote content in some embodiments. Display-camera system 10 displays the display content using display 20 to produce displayed content 48 that is viewable by a local user or users 2 of display-camera system 10. Display-camera system also captures local content (shown as local images 32) of local users 2 through display 20 using a camera 30 and transmits the local content to remote system 60 using link 50.

Display 20 receives display content from control unit 40 and displays the content as displayed content 48 to local users 2. In particular, display 20 receives display content as a sequence of display images 46 and successively displays images 46 in non-overlapping time periods. Display 20 includes a front side that forms an external surface for displaying displayed content 48 to local users 2 and a back side that faces the lens of camera 30. Display 20 is at least partially transparent to allow camera 30 to capture local content, including images of local users 2, through display 20. Display 20 may be a projector, a transparent liquid crystal display (LCD), or an organic light emitting diode (OLED) display. In some embodiments, display 20 may be sufficiently large so as to display life-size images of the remote users of remote system 60.

Camera 30 captures local content in response to control signals from control unit 40. In particular, camera 30 captures local content as a sequence of local images 32 that are captured in non-overlapping time periods. Camera 30 provides local images 32 to control unit 40 and or link 50 for transmission to remote system 60. Camera 30 captures local images 32 within a field of view 34 and with a focal range that at least partially extends beyond the front side of display 20 (e.g., to capture the interactions of the local users 2 with display-camera system 10).

Camera 30 is disposed behind display 20 with a distance that is selected so that field of view 34 encompasses all or substantially all of the front side of display 20 in some embodiments. Camera may also be disposed relative to display 30 so that field of view 34 is aligned with all or a selected portion of the front side of display 20 to allow for a non-arbitrary mapping between camera 30 and display 20. Camera 30 may further be disposed relative to display 30 to capture images 32 with a sense of eye content and gaze awareness of local users 2.

Camera 30 represents any suitable type and number of cameras that capture images through display 20. Camera 30 may include any suitable image sensor, such as a digital charge couple device (CCD) or complementary metal-oxide-semiconductor (CMOS) active pixel sensor.

Control unit 40 provides control signals that control the operation of display 20, camera 30, and link 50. Control unit 40 receives remote images 42 from remote system 60 using link 50 and receives added content 44 from remote system 60 or another remote system (not shown) using link 50 or from a memory in display-camera system 10 (not shown). Control unit 40 generates display images 46 using remote images 42 and/or added content 44, as described in additional detail below, and provides display images 46 to display 20 to cause display 20 to display images 46. Control unit 40 controls the operation of camera 30 to cause local images 32 to be captured and transmitted to remote system 60 using link 50. In one example, control unit 40 may implement time-division multiplexing and cause camera 30 to capture local images 32 while display images 46 are not being displayed by display 20 to reduce video crosstalk in captured images 32. In other examples, control unit 40 may use other suitable video crosstalk suppression methods to reduce video crosstalk in captured images 32.

Control unit 40 may be implemented using any suitable type of processing system (not shown) with a set of one or more processors configured to execute computer-readable instructions stored in a memory system. The memory system includes any suitable type, number, and configuration of volatile or non-volatile machine-readable storage media configured to store instructions and data. Examples of machine-readable storage media in the memory system include hard disk drives, random access memory (RAM), read only memory (ROM), flash memory drives and cards, and other suitable types of magnetic and/or optical disks. The machine-readable storage media are considered to be an article of manufacture or part of an article of manufacture. An article of manufacture refers to one or more manufactured components. When executed, the instructions cause control unit 40 to generate and provide display content and control signals to display 20. The instructions also cause control unit to 40 to generate and provide control signals to camera 30. The instructions also cause control unit to 40 to generate and provide control signals to link 50 to cause remote content and occluding content to be received from remote system 60 and/or other remote systems (not shown) and cause local content to be provided to remote system 60.

Link 50 includes any suitable type, number, and/or configuration of network and/or port devices or connections configured to allow display-camera system 10 to communicate with remote system 60 and/or other remote systems (not shown). The devices and connections of link 50 may operate according to any suitable networking and/or port protocols to allow information to be transmitted by display-camera system 10 to a network, remote system 60, and/or other remote systems (not shown) or received by display-camera system 10 from a network, remote system 60, and or other remote systems (not shown).

Remote system 60 represents any suitable display-camera system, display system, and/or processing system located remotely from display-camera system 10. Remote system 60 captures and/or provides remote content to display-camera system 10 and receives local content from display-camera system 10.

As noted above, control unit 40 forms display images 46 using remote images 42 and any added contents 44. To do so, control unit 40 composites remote images 42 and added content or contents 44 to generate display images 46. Control unit 40 may apply any suitable level of transparency, from fully transparent to partially transparent to fully opaque, to one or both of remote images 42 and added contents 44 in forming display images 46. Control unit 40 may use alpha-blending or any other suitable compositing technique to form display images 46 from remote images 42 and added content 44. Prior to compositing remote images 42, control unit 40 may mirror each remote image 42 about a vertical axis along the center of each image 42 to compensate for each image 42 being captured from behind a remote display by a remote camera.

The level of transparency may be from a default and/or user-selected setting for all types of content (i.e., the same transparency setting for all content) or selected types of content (i.e., different transparency settings for different types of content). With full transparency, added content 44 not visible by local user 2 when composited with by remote images 42 and displayed as displayed image 48. With partially transparency, added content 44 partially obscures remote images 42 when displayed as displayed image 48 such that remote images 42 appears partially visible through added content 44 for local users 2. With full opacity, added content 44 completely obscures remote images 42 when displayed as displayed image 48 such that local users 2 cannot see remote images 42.

Figure 2:
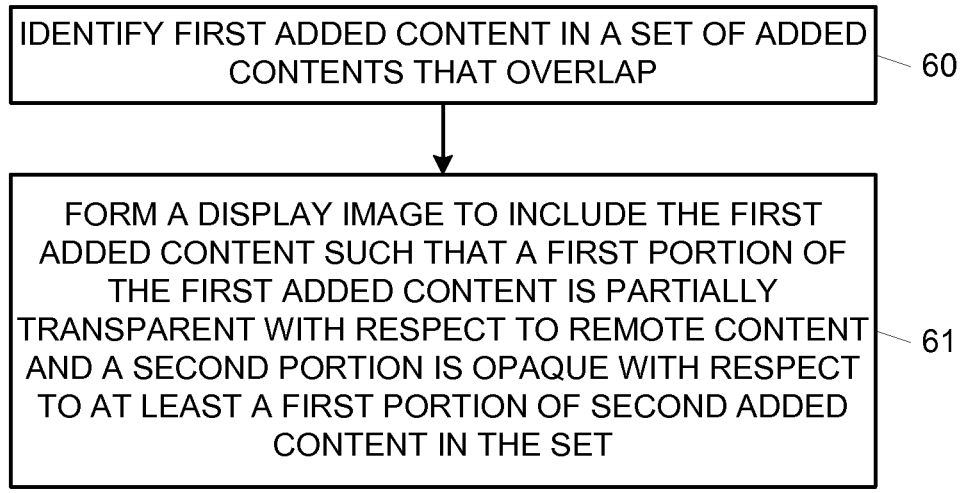
FIG. 2 is a flow chart illustrating an example of a method for generating content for display with content display management.

FIG. 2 is a flow chart illustrating an example of a method for generating content for display with content display management. To manage multiple added contents 44 automatically, control unit 40 identifies first added content 44 in a set of added contents 44 that overlap as indicated in a block 60. To do so, control unit 40 determines a stacking order of added contents 44 with overlapping content from remote content 42 and/or added contents 44. Control unit 40 may determine the stacking order using any suitable technique such as by the type of content of remote content 42 and/or added contents 44, by ordering the added content 44 based on recent use by the local users 2 and/or remote users 62, or by user selection of the stacking order or the policies for determine the stacking order.

Control unit 40 forms a display image 46 to include the first added content 44 such that a first portion of the first added content 44 is partially transparent with respect to the remote content and a second portion of the first added content 44 is opaque with respect to at least a first portion of second added content 44 in the set of added contents 44 where first and second added contents 44 overlap as indicated in a block 61. Control unit 40 uses only the top-most content 44 in the stacking order and the remote content in each overlapping region to form a portion of displayed image 46 for that region. Added contents 44 other than the top-most added content 44 are not used to form displayed image 46 in overlapping regions.

In forming display images 46, control unit 40 uses the default or selected transparency of the top-most content 44 to cause the top-most content 44 to be partially transparent with respect to the remote content, i.e., remote image 42. Because the remaining added contents 44 are not used to form displayed image 46, control unit 40 also causes the top-most content 44 in each overlapping region to be opaque with respect to any other overlapping content 44. As a result, the visibility of the remote users to local users 2 is diminished only by the transparency of a single added content 44 (i.e., the top-most content 44) even in regions where multiple added contents 44 overlap.

In one example, control unit 40 may perform alpha-blending for each pixel of each display image 46 to implement the method shown in FIG. 2. After determining the top-most content 44 for a pixel, control unit 40 computes the value of the pixel to be displayed in display image 46 by combining the corresponding pixels in the top-most content 44 and remote image 42 using an alpha value (i.e., a transparency value). Control unit 40 may compute the value (P) of each pixel in display image 46 using Equation I.

$$P=(aC \times pC)+((1-aC) \times pB) \qquad \text{Equation I}$$

In Equation I, pB is the value of the corresponding pixel in remote image 42, pC is the value of the corresponding pixel in top-most content 44, and aC is the alpha value, which ranges between 0 for fully transparent and 1 for opaque.

In other embodiments of display-camera system 10, camera 30 may be omitted such that display-camera system 10 forms a display system 10 rather than a display-camera system 10. Thus, a display system 10 may display displayed images 48 to local users 2 without transmitting local content to remote system 60.

Figure 3:
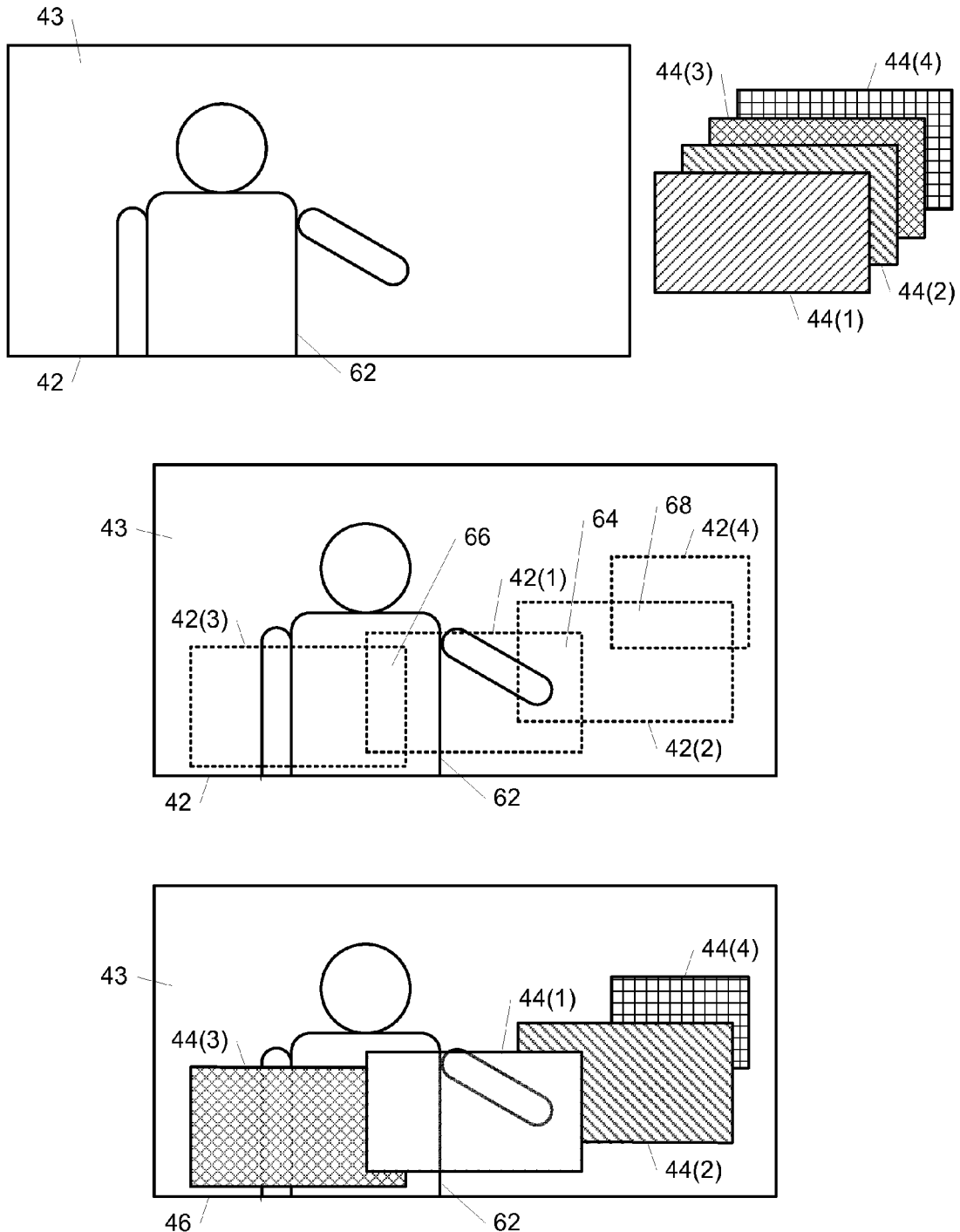
FIG. 3 is a schematic diagram illustrating an example of generating content for display with content display management.

FIG. 3 is a schematic diagram illustrating an example of generating content for display using content display management for overlapping content 42 and 44. The example of FIG. 3 will be described with reference to control unit 40 (shown in FIG. 1). Control unit 40 receives a remote image 42 with remote content 43 that may include one or more remote users 62. Control unit 40 also receives or accesses added contents 44(1)-44(4) that are to be displayed with remote image 42.

In the example of FIG. 3, overlapping regions 42(1)-42(4) of display image 42 are shown to indicate the relative display positions of added contents 44(1)-44(4), respectively, with respect to display image 42. As may be seen, added content 44(1) overlaps with added content 44(2) in a portion 64 and with added content 44(3) in a portion 66 as indicated by dotted boxes 42(1)-42(3). Also, added content 44(2) overlaps with added content 44(4) in a portion 68.

The example of FIG. 3 illustrates six overlapping regions—three multiple added contents 44 overlap (i.e., portions 64, 66, and 68) and three where added contents 44(1)-44(4) overlap only with remote image 42 (e.g., overlapping region 42(3) excluding portion 66).

For each overlapping region, control unit 40 identifies the top-most content 44 and uses only the top-most content 44 and remote image 42 to form a portion of displayed image 46 for that region as follows.

For overlapping region 42(1) including portions 64 and 66, control unit 40 identifies added content 44(1) as the top-most content and uses added content 44(1) and remote image 42, but not added contents 44(2) or 44(3), to form a portion of displayed image 46 with a selected or default transparency.

For overlapping region 42(2) excluding portion 64 but including portion 68, control unit 40 identifies added content 44(2) as the top-most content and uses added content 44(2) and remote image 42, but not added content 44(4), to form a portion of displayed image 46 with a selected or default transparency.

For overlapping region 42(3) excluding portion 66, control unit 40 identifies added content 44(3) as the top-most content and uses added content 44(3) and remote image 42 to form a portion of displayed image 46 with a selected or default transparency.

For overlapping region 42(4) excluding portion 68, control unit 40 identifies added content 44(4) as the top-most content and uses added content 44(4) and remote image 42 to form a portion of displayed image 46 with a selected or default transparency.

As shown in display image 46 in FIG. 3, control unit 40 formed added content 44(1) to be partially transparent with respect to remote content 43 so that portions of remote content 43 that include portions of remote user 62 will be visible to local user 2 through added content 44(1) when display image 46 is displayed by display 20 as a displayed image 48. Control unit 40 formed added content 44(1) with a relatively high amount of transparency in the example of FIG. 3 to allow remote user 62 to be more clearly seen by local users 2. Control unit 40 also formed added content 44(1) to be opaque with respect to added contents 44(2) and 44(3) so that the portions of added contents 44(2) and 44(3) that correspond to overlapping portions 64 and 66 are not visible to local user 2 when display image 46 is displayed by display 20 as a displayed image 48. As a result, gestures by remote user 62 that extend into overlapping portion 64 remain visible to local users 2 and allow the local users 2 to unambiguously associate the gestures with added content 44(1).

Also shown in FIG. 3, control unit 40 formed added content 44(2) to be partially transparent or fully opaque with respect to remote content 43 so that portions of remote content 43 may or may not be visible to local user 2 through added content 44(2) when display image 46 is displayed by display 20 as a displayed image 48. Control unit 40 also formed added content 44(2) to be opaque with respect to added content 44(4) so that the portion of added content 44(4) that corresponds to overlapping portion 68 is not visible to local user 2 when display image 46 is displayed by display 20 as a displayed image 48. Control unit 40 further formed the portion of added content 44(2) that overlaps with added content 44(1) (i.e., portion 64) to be fully occluded such that this portion of added content 44(2) is not visible to local user 2 when display image 46 is displayed by display 20 as a displayed image 48.

Control unit 40 formed added content 44(3) to be partially transparent with respect to remote content 43 so that portions of remote content 43 will be visible to local user 2 through added content 44(3) when display image 46 is displayed by display 20 as a displayed image 48. Control unit 40 formed added content 44(3) with a lower amount of transparency than added content 44(1) such that remote content 43, particularly remote user 62, is somewhat less visible to local users 2 through added content 44(3) than the remote content 43 through added content 44(1). Control unit 40 also formed the portion of added content 44(3) that overlaps with added content 44(1) (i.e., portion 66) to be fully occluded such that this portion of added content 44(3) is not visible to local user 2 when display image 46 is displayed by display 20 as a displayed image 48.

Control unit 40 formed added content 44(4) to be partially transparent with respect to remote content 43 so that portions of remote content 43 will be visible to local user 2 through added content 44(4) when display image 46 is displayed by display 20 as a displayed image 48. Control unit 40 also formed the portion of added content 44(4) that overlaps with added content 44(2) (i.e., portion 68) to be fully occluded such that this portion of added content 44(4) is not visible to local user 2 when display image 46 is displayed by display 20 as a displayed image 48.

In an alternative embodiment of the management method, the portions of added content 44 that do occlude underlying added content 44 (e.g., areas 64, 66, and 68) may be visibly distinguished to local user 2 by a small change in transparency and/or added color. The distinction may serve to indicate the presence of one added content 44 that is completely overlapped and occluded by another added content 44.

Figure 4:
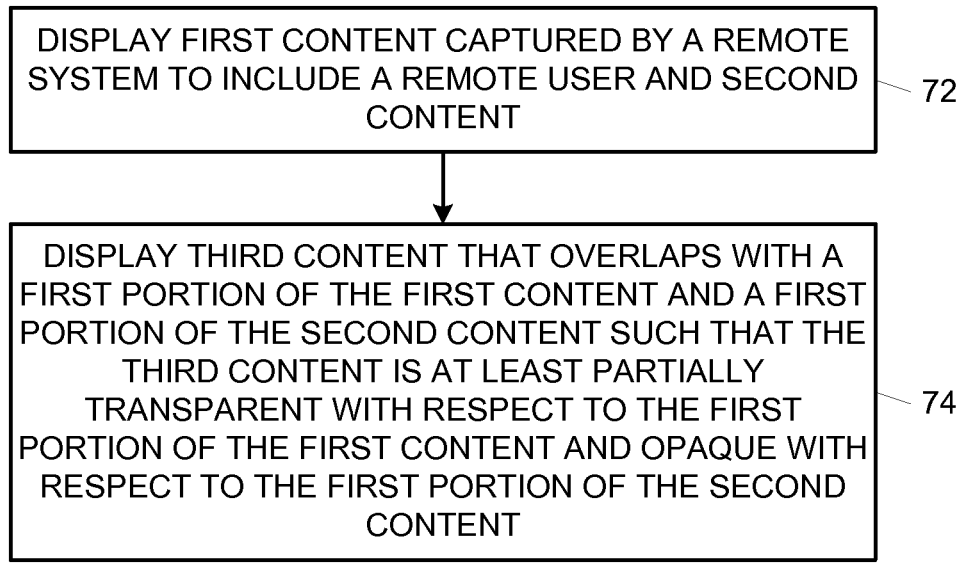
FIG. 4 is a flow chart illustrating an example of a method for displaying content with content display management.

After generating display images 46, control unit 40 provides display images 46 to display 20 for display as displayed images 48. FIG. 4 is a flow chart illustrating an example of a method for displaying content with content display management. The example of FIG. 4 will be described with reference to display 20 (shown in FIG. 1) and the example of FIG. 3.

In FIG. 4, display 20 displays first content 43 captured by remote system 60 to include a remote user 62 (i.e., the remote content) and second content 44(2) as indicated in a block 72. Display 20 further displays third content 44(1) that overlaps with a first portion 42(1) of first content 43 and a first portion 64 of second content 44(2) such that third content 44(1) is partially transparent with respect to first portion 42(1) of first content 43 and opaque with respect to first portion 64 of second content 44(2) as indicated in a block 74.

In the above examples, the remote content and added contents 44 may comprise windows formed by an operating system executed by control unit 40 or another processing system in conjunction with control unit 40. In these examples, the top-most content 44 may also be referred to as the active window, and added contents 44 that overlap with the top-most content 44 may also be referred to as inactive windows. The windows may be created as described above for the remote content and added contents 44 such that an active window may have a portion that is partially transparent with respect to the remote content and opaque with respect to any overlapping inactive windows.

The above embodiments of display-camera system 10 may advantageously preserves the functional transparency of selected added content on a display where multiple added contents are being displayed. The embodiments may reduce the tendency of underlying windows to distract a user without requiring the user to actively manage the displayed content.

What is claimed is:

1. A method performed by a processing system with content display management, the method comprising: identifying a first added content in a set of added contents that overlap; and forming a display image to include the first added content such that a first pixel of the first added content is partially transparent with respect to remote content captured by a remote system and, at the same time, the first pixel of the first added content is opaque with respect to all other added contents.

2. The method of claim 1 further comprising:
   displaying the display image.

3. The method of claim 1 further comprising:
   determining a stacking order of the set of added contents; and
   identify the first added content as the top-most content in the stacking order.

4. The method of claim 1 wherein a first portion of a second added content overlaps with the remote content but not with the first added content.

5. The method of claim 4 further comprising:
   forming the display image such that a second pixel in the first portion of the second added content is partially transparent with respect to the remote content.

6. The method of claim 1 wherein the remote content is captured by the remote system to include a remote user and received by the processing system.

7. The method of claim 1 further comprising:
capturing local content to include a local user; and
providing the local content to the remote system.

8. The method of claim 1, wherein a presence of an obscured portion of second added content is indicated in the display image by a color.

9. The method of claim 1, wherein a presence of an obscured portion of second added content is indicated in the display image by a small change in transparency of the first added content.

10. The method of claim 1, wherein the amount of transparency applied to the remote content depends upon the type of the first added content.

11. The method of claim 1, wherein a perspective of the remote content is from behind a transparent display.

12. The method of claim 11, wherein the remote content is modified to coordinate with displayed added content.

13. A system comprising: a display; and a control unit to cause the display to display first content captured by a remote system to include a remote user and second content; wherein the control unit is to cause the display to display third content that overlaps with a first portion of the first content and a first portion of the second content such that a first pixel in the overlapping portion of the third content is partially transparent with respect to the first portion of the first content and, at the same time, opaque with respect to the second content.

14. The system of claim 13 wherein the first content is captured by the remote system to include a remote user.

15. The system of claim 13 wherein a portion of the second content overlaps with a portion of the first content but not the third content, wherein a second pixel in the overlap region of the second and first contents but not the third content is transparent to the second and first content.

16. The system of claim 13 further comprising:
a camera;
wherein the control unit is to cause the camera to fourth content to include a local user and provide the fourth content to the remote system.

17. An article comprising at least one machine-readable storage medium storing instructions that, when executed by a processing system, cause the processing system to: set a first pixel of first content to be partially transparent with respect to second content captured by a camera that overlaps with the first content; at the same time, set the first pixel to be opaque with respect to a third content that overlaps with the first content; and provide the first content to a display for display.

18. The article of claim 17, wherein the second content is captured by a remote system to include a remote user.

19. The article of claim 17, wherein the third content overlaps with the second content.

20. The article of claim 17, wherein the instructions, when executed by the processing system, cause the processing system to:
set a second pixel in a second portion of the first content to be opaque by combining the first content with the second content but not the third content.

* * * * *